(12) United States Patent
Mizobuchi et al.

(10) Patent No.: US 7,856,202 B2
(45) Date of Patent: Dec. 21, 2010

(54) IMAGE FORMING APPARATUS, IMAGE FORMING METHOD, AND PROGRAM FOR IMPROVING THE INTEREST OF THE USER IN ENVIRONMENTAL RESOURCE EXHAUSTION

(75) Inventors: Yuki Mizobuchi, Nara (JP); Takao Fukuda, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 601 days.

(21) Appl. No.: 11/825,275

(22) Filed: Jul. 5, 2007

(65) Prior Publication Data
US 2008/0008508 A1    Jan. 10, 2008

(30) Foreign Application Priority Data
Jul. 6, 2006    (JP) .............................. 2006-186811

(51) Int. Cl.
*G03G 15/00*    (2006.01)
(52) U.S. Cl. ........................... 399/389; 399/81; 399/82; 399/83; 399/85
(58) Field of Classification Search .................. 399/389, 399/24, 81, 83, 85
See application file for complete search history.

(56) References Cited

U.S. PATENT DOCUMENTS

2005/0231758 A1* 10/2005 Reynolds ................... 358/1.15

2006/0204302 A1*  9/2006 Murakami .................. 399/411

FOREIGN PATENT DOCUMENTS

| JP | 2002-006696 | 1/2002 |
| JP | 2002-304092 | 10/2002 |
| JP | 2004-330639 | 11/2004 |

OTHER PUBLICATIONS

JP 2004-330639 Published Nov. 25, 2004 Printer, printing management system, printer control program, and printing management program. Machine translation of detailed description.*
"The Energy Conservation Center, Japan", "Standard Values of Energy Saving under the International Energy Star Program", [online], [retrieved on May 18, 2006], the Internet URL:http://www.eccj.or.jp/ene-star/prog/p9.html.

* cited by examiner

*Primary Examiner*—Ren Yan
*Assistant Examiner*—Matthew G Marini
(74) *Attorney, Agent, or Firm*—Edwards Angell Palmer & Dodge LLP; David G. Conlin; Peter J. Manus

(57) ABSTRACT

An image forming apparatus is provided that can improve the interest of the user in the ecology. The apparatus includes an image input portion that inputs image data, a printing portion that prints onto a recording sheet an image indicated by the image data inputted by the image input portion, a condition setting portion that sets printing conditions for executing printing by the printing portion, a displaying portion that displays the printing conditions that the condition setting portion has set, a used amount calculating portion that calculates the used amount of paper from the size of and the number of recording sheets used by executing printing by the printing portion based on the printing conditions set by the condition setting portion, and a display controlling portion that controls the displaying portion to display the used amount calculated by the used amount calculating portion.

5 Claims, 11 Drawing Sheets

IMAGE FORMING APPARATUS, IMAGE FORMING METHOD, AND PROGRAM FOR IMPROVING THE INTEREST OF THE USER IN ENVIRONMENTAL RESOURCE EXHAUSTION

CROSS-NOTING PARAGRAPH

This Nonprovisional application claims priority under 35 U.S.C. §119(a) on Patent Application No. 2006-186811 filed in JAPAN on Jul. 6, 2006, the entire contents of which are hereby incorporated herein by references.

FIELD OF THE INVENTION

The present invention relates generally to an image forming apparatus, an image forming method, and programs, and, more particularly, to an image forming apparatus such as a printer, a copying machine, or a multifunction peripheral that can form an image on a paper sheet, an image forming method, a display controlling program to be installed into the image forming apparatus, and a printing controlling program to be installed into a computer connected to the image forming apparatus.

BACKGROUND OF THE INVENTION

Recently, in various devices, electric power is saved due to the prevalence of low-power-consumption types of devices from the viewpoint of respecting the environmental conservation and the environment-friendly performance. In the International Energy Star Program, standard values of energy consumption are defined for seven kinds of items, that are, computers, displays, printers, scanners, facsimile machines, copying machines, and multifunction peripherals (see, for example, an incorporated foundation "The Energy Conservation Center, Japan", "Standard Values of Energy Saving under the International Energy Star Program", [online], [retrieved on May 18, 2006], the Internet <URL: http://www.eccj.or.jp/ene-star/prog/p9.html>).

Japanese Laid-Open Patent Publication No. 2002-006696 discloses a technique which converts the value of the power consumption consumed by use of an image forming apparatus during a specific time period into the amount of $CO_2$ discharged, obtains the amount of $CO_2$ discharged from the consumption of the expendable supplies consumed by the use of the image forming apparatus during the specific time period, and outputs the total amount of $CO_2$ discharged as the amount of $CO_2$ discharged of the image forming apparatus during the specific time period.

Though the standard values for saving electric power are defined in the Energy Star Program as in the above webpage, those standard values are only to regulate the maximum electric power consumption in the low power consumption state (standby mode) by classifying the power consumption in the low power consumption state of an image forming apparatus based on the largest recoding paper sheet and the printing speed. That is, in the Energy Star Program, there are no regulations on power consumption in the operation of the image forming apparatus and supplies and replaceable portions that consumed when the image forming apparatus forms an image.

The above Japanese Laid-Open Patent Publication No. 2002-006696 describes the technique that displays the amount of $CO_2$ discharged converted from the power consumption of the image forming apparatus. However, as to a recording sheet that is one of the supplies used when an image is formed, the amount of $CO_2$ discharged is only displayed, that is obtained from the power consumed when the recording sheet is produced. The portion of the amount of $CO_2$ discharged is not recognized by the ordinary users, and even when the portion is presented to the users, an improvement of the interest of the users in the ecology can not be expected.

SUMMARY OF THE INVENTION

The object of the present invention is to provide an image forming apparatus, an image forming method, a program to control displaying to be installed in the image forming apparatus, a program to control printing to be installed in a computer connected to the image forming apparatus, that can display the amount of recording sheet used by a user when an image is formed and that can improve an interest of the user in the ecology.

More specifically, the object of the present invention is to provide an image forming apparatus having an image input portion that inputs image data, a printing portion that prints onto a recording sheet an image indicated by the image data inputted by the image input portion, a condition setting portion that sets printing conditions for executing printing by the printing portion, and a displaying portion that displays the printing conditions that the condition setting portion has set, the apparatus comprising: a used amount calculating portion that calculates the used amount of paper from the size of and the number of recording sheets used by executing the printing by the printing portion based on the printing conditions that the condition setting portion has set, and a display controlling portion that controls the displaying portion to display the used amount that the used amount calculating portion has calculated.

The object of the present invention is to provide an image forming apparatus, wherein the used amount calculating portion calculates the number of predetermined wood used as the used amount of paper from the size of and the number of recording sheets used by executing the printing by the printing portion based on the printing conditions that the condition setting portion has set.

The object of the present invention is to provide an image forming apparatus, further comprising, a storing portion that stores a plurality of types of recording sheets and the number of wood used for each type of the recording sheets by relating to each other, and a paper sheet designating portion that designates the recording sheet to be used by the printing portion, wherein the used amount calculating portion reads from the storing portion the number of wood used corresponding to the recording sheet that the paper sheet designating portion has designated, and uses the number to calculate the used number of the predetermined wood.

The object of the present invention is to provide an image forming apparatus, wherein the used amount calculating portion executes the calculation of the used amount of the paper in a state where the image input portion has completed the inputting of the image data and the condition setting portion has executed the setting of the printing conditions.

The object of the present invention is to provide an image forming apparatus, wherein the display controlling portion controls the displaying portion to display the used amount that the used amount calculating portion has calculated, after the printing portion has executed the printing.

The object of the present invention is to provide an image forming apparatus, wherein the display controlling portion controls the displaying portion to display the used amount that the used amount calculating portion has calculated as a used amount under the current printing conditions together with the printing conditions that the condition setting portion has set before the printing portion executes the printing.

The object of the present invention is to provide an image forming apparatus, wherein the condition setting portion comprises a resetting portion that resets the printing conditions.

The object of the present invention is to provide an image forming apparatus, wherein the used amount calculating portion calculates the used amount of paper based on the current printing conditions and calculates the used amount of paper under other printing conditions, and extracts the used amount of paper under printing conditions under which the used amount of paper is less than the used amount of paper under the current printing conditions, the display controlling portion controls the displaying portion to display one or more of printing conditions under which the used amount of paper is less than the used amount of paper under the current printing conditions as proposed conditions, and the resetting portion causes a user to select conditions to be employed from the proposed conditions and the current printing conditions displayed on the displaying portion and executes resetting of the printing conditions based on the selection result.

The object of the present invention is to provide an image forming apparatus, wherein the used amount calculating portion comprises a default used amount calculating portion that calculates the used amount of paper for default printing from the size of and the number of paper sheets onto which the image indicated by the image data inputted by the image input portion is printed as it is, and when the used amount of paper for set printing calculated from the size of and the number of paper sheets and the used amount of paper for default printing calculated by the default used amount calculating portion are different for the image indicated by the image data inputted by the image input portion, the used amount calculating portion calculates the amount by which the used amount of paper is increased or reduced from the used amount of paper for the default printing to the used amount of paper for the set printing, and the display controlling portion controls the displaying portion to display the amount of paper increased or decreased that the used amount calculating portion has calculated.

The object of the present invention is to provide an image forming apparatus, wherein the condition setting portion is a portion that sets conditions including any one or more of variable power printing, aggregating printing, and duplex printing as the printing conditions employed when the printing portion executes printing.

The object of the present invention is to provide an image forming apparatus, further comprising an accumulating portion that accumulates and stores the used amount that the used amount calculating portion has calculated, only when the printing portion has executed printing, wherein the display controlling portion controls the displaying portion to display the accumulation result of the used amounts that the accumulating portion has accumulated.

The object of the present invention is to provide an image forming apparatus, further comprising a user identifying portion that identifies a user, wherein the accumulating portion executes the accumulation for each user that the user identifying portion has identified, and the display controlling portion controls the displaying portion to display the accumulation result of the used amount that the accumulating portion has accumulated for the user identified by the user identifying portion.

The object of the present invention is to provide an image forming apparatus, further comprising a user identifying portion that identifies a user, wherein the accumulating portion executes the accumulation for each user that the user identifying portion has identified and judges whether the result of the accumulation is a used amount that is equal to or more than a predetermined amount, and the display controlling portion controls the displaying portion to display a warning when the result is equal to or more than the predetermined used amount.

The object of the present invention is to provide an image forming method of executing printing onto a recording sheet in an image forming apparatus, including an image inputting step by an image input portion for inputting image data, a condition setting step by a condition setting portion for setting printing conditions for executing printing, a displaying step by a displaying portion for displaying the printing conditions set at the condition setting step, and a printing step by a printing portion for printing onto a recording sheet an image indicated by the image data inputted at the image inputting step based on the printing conditions set at the condition setting step, and a used amount calculating step by a used amount calculating portion for calculating the used amount of paper from the size of and the number of recording sheets used by executing printing by the printing portion based on the printing conditions set at the condition setting step and a display controlling step by a display controlling portion for controlling the displaying portion to display the used amount calculated at the used amount calculating step.

The object of the present invention is to provide a display controlling program to be installed in a controlling portion of an image forming apparatus including an image input portion that inputs image data, a printing portion that prints onto a recording sheet an image indicated by the image data inputted by the image input portion, a condition setting portion that sets printing conditions for executing printing by the printing portion, and a displaying portion that displays the printing conditions that the condition setting portion has set, and the program being operable to drive controlling portion to execute: a used amount calculating step for calculating the used amount of paper from the size of and the number of recording sheets used by executing the printing by the printing portion based on the printing conditions set by the condition setting portion, and a display controlling step for controlling the displaying portion to display the used amount calculated at the used amount calculating step.

The object of the present invention is to provide a program to be installed in a computer connected to an image forming apparatus through a network, and the program being operable to drive the computer to execute: an image identifying step for identifying image data to be printed in the image forming apparatus; a condition setting step for setting printing conditions for executing the printing in the image forming apparatus while causing a displaying apparatus to display the printing conditions; a used amount calculating step for calculating the used amount of paper from the size of and the number of recording sheets used by executing printing in the image forming apparatus based on the printing conditions set at the condition setting step; and a used amount displaying step for controlling the displaying apparatus to display the used amount calculated at the used amount calculating step.

PREFERRED EMBODIMENTS OF THE INVENTION

An image forming apparatus according to the present invention can display the used amount of recording sheets that a user uses when an image is formed, and enables the interest of the user in the ecology to be improved. The image forming apparatus according to the present invention can be applied to any apparatus that can print the image data inputted by reading a document or a file onto a recording sheet corresponding to the printing conditions that the user desires, and a multifunction peripheral or a printer having a copying function, a facsimile function, a printing function, etc., corresponds to the above apparatus. The image forming apparatus according to the present invention may be an image forming apparatus that enables the user to execute printing in response to a printing requesting processing from a computer such as a PC through a network (including a peer-to-peer type network).

Figure 1:
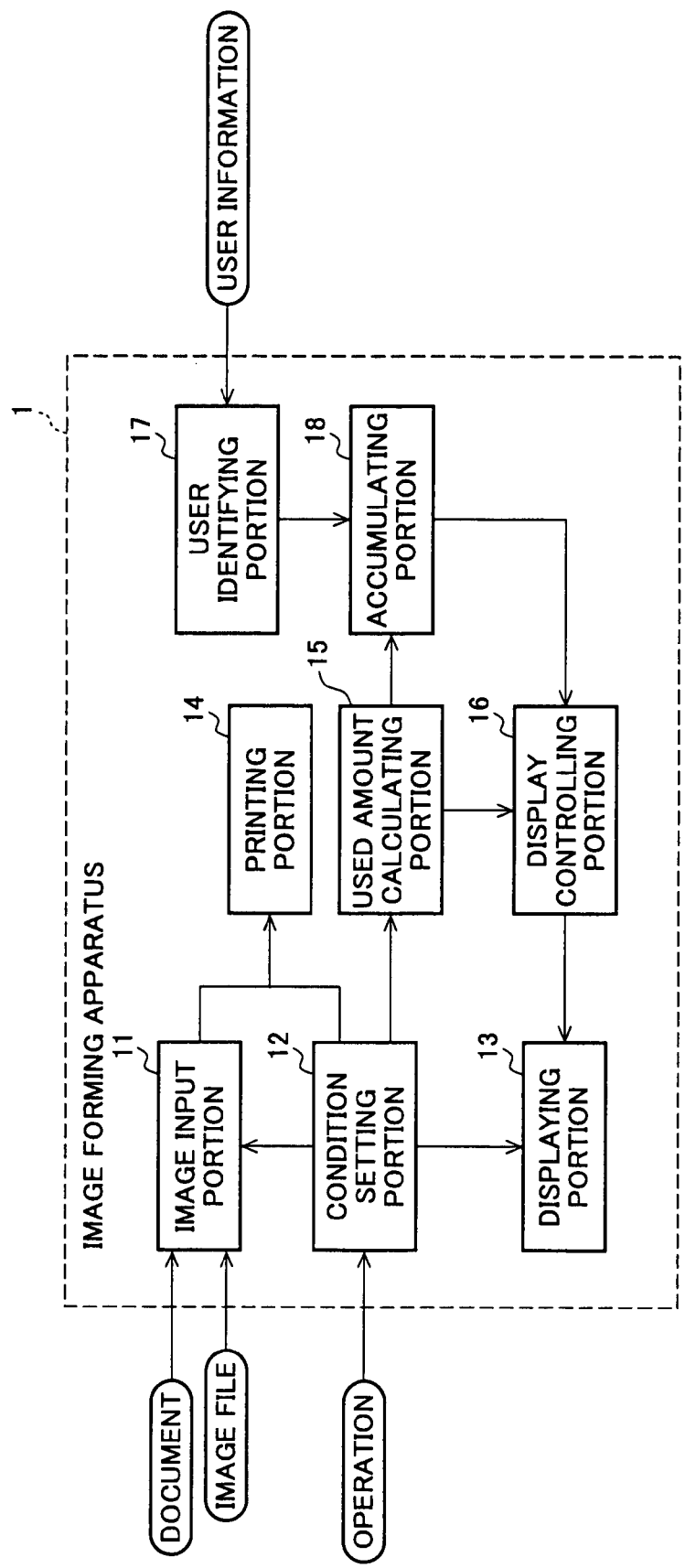
FIG. 1 depicts an exemplary configuration of an image forming apparatus according to an embodiment of the present invention.

FIG. 1 depicts an exemplary configuration of an image forming apparatus according to an embodiment of the present invention. In FIG. 1, "1" denotes the image forming apparatus. The image forming apparatus 1 according to the present invention includes an image input portion 11, a condition setting portion 12, a displaying portion 13, a printing portion 14, a used amount calculating portion 15, and a display controlling portion 16, and preferably includes a user identifying portion 17 and/or an accumulating portion 18, that is (are) described later.

The image input portion 11 consists of a document reading apparatus (scanner apparatus) and/or a file reading apparatus, and takes in image data. When a document is set on a document bed or in an ADF (automatic document feeder), the document reading apparatus optically reads an image on the document and outputs the image data thereof. The file reading apparatus executes input of image data in the form of input of an electronic file such as reading a document file from a hard disk in the image forming apparatus 1 or reading a document file from an external device such as a PC by transfer of a file or reception of email through a network.

The printing portion 14 prints an image indicated by the image data inputted by the image input portion 11 onto a recording sheet. Any portion that can print images can be employed as the printing portion 14, and various types of portion can be used such as: a portion that once forms an image on a photo-sensitive drum, transfers the image onto a recording sheet, and fixes the image; and a portion that directly sprays ink onto a recording sheet.

The condition setting portion 12 is a portion that sets printing conditions employed when the printing portion 14 executes printing based on the default or user input. An information input portion such as, for example, a touch panel for operations (the displaying portion 13 corresponds to a display part) or operating keys corresponds to the condition setting portion 12. The displaying portion 13 is a portion that displays the printing conditions set by the condition setting portion 12. The condition setting portion 12 accepts an input data from the user (including a selection input) inputted using a input button, etc., based on a printing condition setting picture displayed by the displaying portion 13. The displaying portion 13 sequentially updates the contents of the display based on the input. Though the displaying portion 13 preferably displays the picture used during the setting of the printing conditions as above, the displaying portion 13 may display at least printing conditions after the setting thereof.

The used amount calculating portion 15 that is the main featured part of the present invention calculates the used amount of paper from the size and the number of recording sheets used or to be used by executing printing by the printing portion 14 based on the printing conditions set by the condition setting portion 12. The display controlling portion 16 that is another main featured part of the present invention controls the displaying portion 13 to display the used amount calculated by the used amount calculating portion 15. In this case, the used amount calculated and displayed represents the reduced amount of paper, that is one of the environmental resources (actually wood). According to the present invention, in this manner, the used amount of the recording sheets that the user uses when an image is formed can be displayed and the interest of the user in the ecology can be improved.

A portion that displays the used amount of paper sheets obtained from the printing conditions set by the condition setting portion 12 may be included. Therefore, the condition setting portion 12 is preferably a portion that sets conditions including any one or more of variable power printing (such as shrinking printing, enlarging printing, variable power printing with designated paper sheets), aggregating printing (n in one), and duplex printing as the printing conditions employed when the printing portion 14 executes printing. When the apparatus is set executing color printing onto high quality paper sheets and black-and-white printing onto ordinary paper sheets, whether printing in color or in black and white becomes one of the printing conditions that is related to the used amount of the paper sheets.

The used amount calculating portion 15 preferably calculates the used number of predetermined wood as the used amount of paper from the size and the number of recording sheets used or to be used by executing printing by the printing portion 14 based on the printing conditions set by the condition setting portion 12, and the display controlling portion 16 preferably controls display of the number of predetermined wood. The used number of predetermined wood refers to the used quantity of wood of a predetermined kind and a predetermined size. By displaying the used amount of wood that is one of the environmental resources that the user has used when an image is formed, the user can be inspired to recognize the used amount more specifically and the interest of the user in the ecology can be further improved.

In calculating and displaying the number of predetermined wood used as the used amount of the paper sheets, the "predetermined wood (defined wood)" can preferably be designated from a plurality of types of wood. Therefore, the image forming apparatus 1 preferably includes: a storing portion (corresponding to wood information table and a storing area thereof that are described later) that stores a plurality of types of recording sheets and the used amount of wood for each recording sheet (such as "per one sheet" or "per 1 $m^2$) by relating to each other; and a paper sheet designating portion that designates a recording sheet used by the printing portion 14. The used amount calculating portion 15 reads from the storing portion the used number of wood that corresponds to the recording sheet designated by the paper sheet designating portion, and uses the number for calculation of the number of predetermined wood used.

The wood information table registers the weight of a paper sheet for each size thereof such as, for example, 7.98336 [g] for an A3 paper sheet, 3.99168 [g] for an A4 paper sheet, 1.99584 [g] for an A5 paper sheet, 0.99792 [g] for an A6 paper sheet, 0.49896 [g] for an A7 paper sheet, 5.648 [g] for an B4 paper sheet, 2.824 [g] for an B5 paper sheet, 1.412 [g] for an B6 paper sheet, 0.706 [g] for an B7 paper sheet, in case of ordinary paper that weighs 64 [$g/m^2$] per one sheet. In the calculation, each of these weights is preferably divided by the weight of one predetermined wood and the division result is preferably multiplied by the number of paper sheets to be printed. The wood information table may register the number of defined wood per one paper sheet for each paper sheet size (a value obtained by dividing each of the above weights by the weight per defined wood) instead of the above weight of a paper sheet for each size. A standing tree having the trunk diameter of 0.3 m and the height of 10 m is preferably employed as the size of a defined wood and it is useful to obtain the used amount of the paper by converting from the number of the trees.

The kind of a recording sheet portion not only the size of the paper sheet but also the kind such as what the kind of the tree is, whether the paper is ordinary paper, whether the paper is recycled paper, whether the paper is card board paper. Therefore, even when a recording sheet having the same size is used, the calculation result differs depending on whether printing is executed onto a recycled paper sheet or onto an ordinary paper sheet (in addition, whether printing is executed onto a high quality paper sheet or onto a low quality paper sheet, etc.) as a printing condition. Taking a specific example, when a paper sheet is fed from a cassette containing one-side-used paper sheets as a printing condition, because the one-side-used paper sheets have been once used in the calculation, these paper sheets preferably are not included in the used amount to be calculated, that is, the used amount thereof preferably is set to be zero.

The used amount calculating portion 15 preferably executes the calculation after actually taking in an image to be printed. To do this, the used amount calculating portion 15 preferably calculates the used amount of paper in the state where the image input portion 11 has completed input of the image data to be printed and the condition setting portion 12 has set the printing conditions. Alternatively, the used amount calculating portion 15 needs to execute the calculation after obtaining the information of the number of sheets and the size of documents (document paper sheets or a document file) from the user's input.

The displaying portion 13 may display the used amount after the printing. To do this, the display controlling portion 16 may control the displaying portion 13 to display the used amount calculated by the used amount calculating portion 15 after the printing portion 14 has executed printing. In this case, the calculation itself of the used amount may be executed after the printing has been executed. After the printing, the used amount may be displayed simultaneously when the user may execute operations such as resetting of the printing conditions that the user has used and may watch the display screen. By executing display after the printing has been executed, how much the used amount is as the result of the printing this time can be displayed.

Conversely, the displaying portion 13 may display the used amount before the printing or during the printing. To do this, before or during the execution of the printing by the printing portion 14, the display controlling portion 16 controls the displaying portion 13 to display the used amount calculated by the used amount calculating portion 15 as the used amount under the current printing conditions together with the printing conditions set by the condition setting portion 12. The user often stays beside the apparatus when the number of paper sheets to be printed is not large and, therefore, the user has enough time to check the contents displayed on the setting screen before or during the printing. By displaying the used amount during at the moment, the user can be inspired to recognize more deeply the used amount.

The accumulating portion 18 accumulates the used amount calculated by the used amount calculating portion 15 only when the printing portion 14 has executed printing, and stores the accumulation result in a predetermined storing portion. When the image forming apparatus 1 includes the accumulating portion 18, the display controlling portion 16 preferably controls the displaying portion 13 to display the accumulation result of the used amount accumulated by the accumulating portion 18. Thereby, not only the used amount of the paper used in the printing of this time but also the accumulation value of the used amounts of paper can be displayed and the interest in the ecology can be increased.

The user IDs (and the password) of an individual or a group user are inputted in the user identifying portion 17 and the user identifying portion 17 compares the ID with the information recorded in advance, or reads an IC card inserted therein and authenticates the card and, thereby, identifies a user. As described above, the present invention can be applied to the case where a group such as a department is authenticated as a user. It is preferable to not only identify a user but also execute authentication. The user identification can be used for displaying the accumulated amounts in the present invention.

As one form of displaying the accumulated amounts, the accumulating portion 18 preferably executes the accumulation for each user identified by the user identifying portion 17, and the display controlling portion 16 preferably controls the displaying portion 13 to display the accumulation result of the used amounts accumulated by the accumulating portion 18 for the users identified by the user identifying portion 17. Thereby, the accumulation can be displayed for each individual and each individual can clearly grasp how much environmental resources the individual has consumed and the interest in the ecology can be increased more. Therefore, the users tend to consider, as an alternative, to decrease printing, to execute printing that consumes less paper, and to read a document by recording it in a file in a hard disk that consumes no paper.

Another form of displaying the accumulated amounts can be a form according to which the accumulating portion 18 preferably executes the accumulation for each user identified by the user identifying portion 17 and judges whether the accumulation result is a used amount that is equal to or more than a predetermined amount or not, and the display controlling portion 16 preferably controls the displaying portion 13 to display a warning when the accumulation result is the used amount that is equal to or more than the predetermined amount. In stead of displaying the warning or together with the warning, a control to make a warning sound may be executed. Thereby, a user can be caused to recognize, by displaying the warning, that how much the user him/herself has consumed the environmental resources and the consumption has exceeded the limit. Therefore, the user him/herself can be forced to be more interested in the ecology and to consider alternatives such as refraining from printing as described above.

Figure 2:
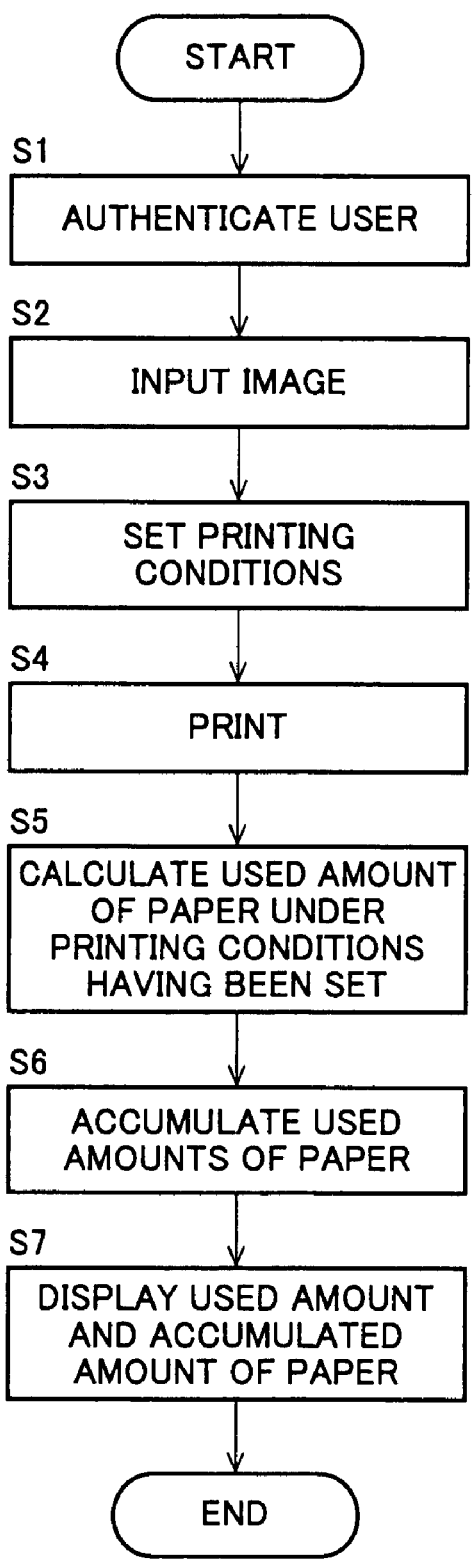
FIG. 2 is an explanatory flowchart of an example of a used amount displaying processing in the image forming apparatus of FIG. 1 and is also an explanatory flowchart of an image forming method according to an embodiment of the present invention.

An image forming method to execute printing onto a recording sheet in the image forming apparatus 1 that employs one of the above exemplary configurations (a used amount displaying method of displaying the used amount of paper) will be exemplified. FIG. 2 is an explanatory flowchart of an example of a used amount displaying processing, in the image forming apparatus of FIG. 1 and is also an explanatory flowchart of an image forming method according to an embodiment of the present invention.

The user identifying portion 17 identifies a user and executes authentication therefor (step S1). When the authentication has been completed, the following processing steps are executed. The apparatus accepts designation by the user of an image to be printed and the image input portion 11 inputs image data based on the designation (step S2). The condition setting portion 12 sets printing conditions to be employed when the printing is executed at a printing step (step S3). At step S3, the displaying portion 13 also executes a processing to display the printing conditions set at the condition setting step. In this case, the user can be caused to execute the designation of the image to be printed as the target of the setting by the condition setting portion 12.

The printing portion 14 prints the image indicated by the image data inputted at the image input step onto a recording sheet based on the printing conditions having been set (step S4). The used amount calculating portion 15 calculates the used amount of paper from the size and the number of recording sheets used or to be used by executing the printing by the printing portion 14 based on the printing conditions set at the condition setting step (step S5). The accumulating portion 18 reads the accumulated amount accumulated by this moment of the user authenticated at step S1, adds the calculated amount used in this printing, and calculates an accumulated amount (step S6). The display controlling portion 16 controls the displaying portion 13 to display the used amount and the user's accumulated amount calculated at the used amount calculating step, and the displaying portion 13 displays the used amount and the accumulated amount (step S7).

Figure 3:
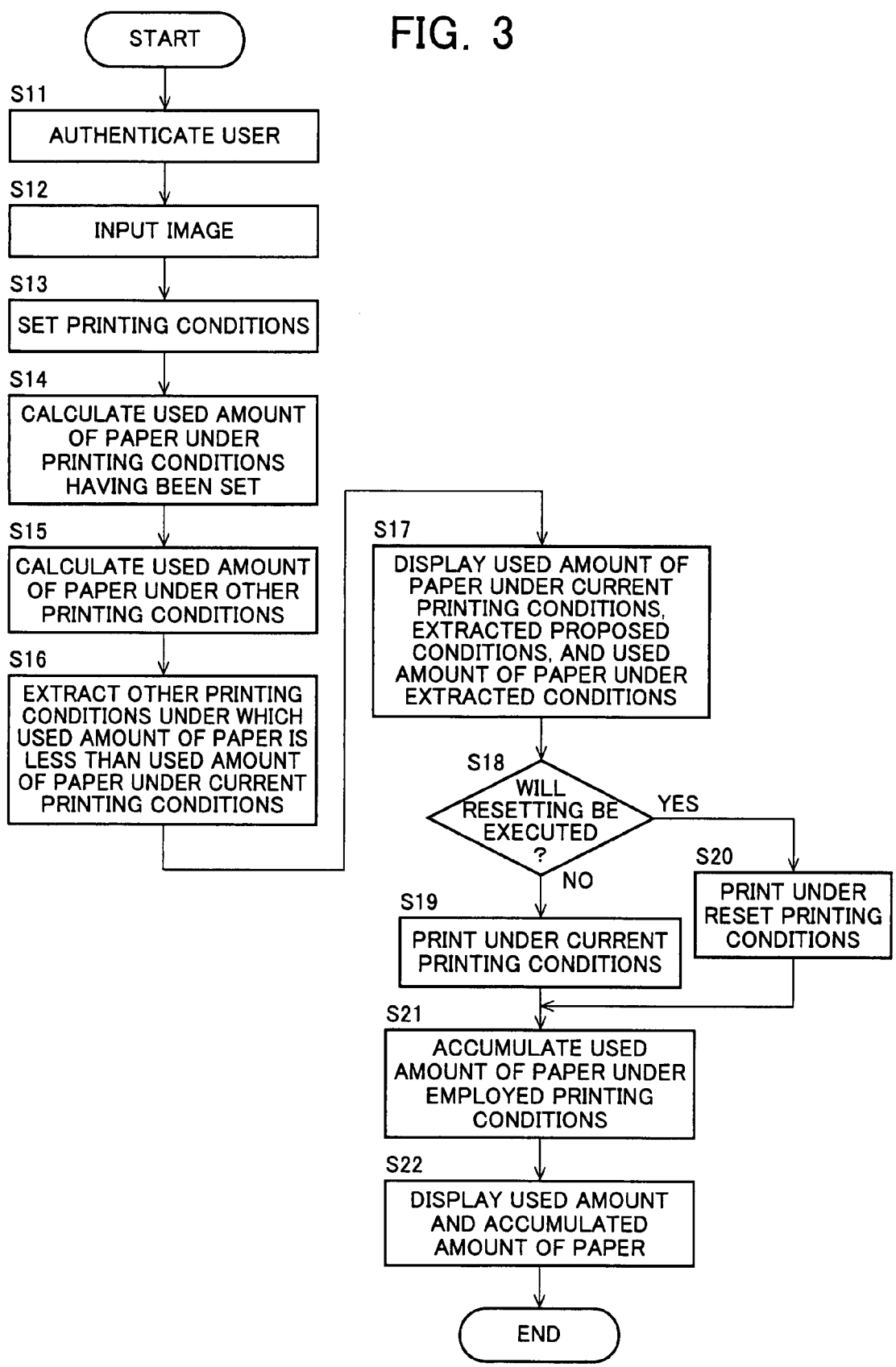
FIG. 3 is an explanatory flowchart of another example of the used amount displaying processing in the image forming apparatus of FIG. 1 and is also an explanatory flowchart of the image forming method according to another embodiment of the present invention.

FIG. 3 is an explanatory flowchart of another example of the used amount displaying processing in the image forming apparatus of FIG. 1 and is also an explanatory flowchart of the image forming method according to another embodiment of the present invention.

The image forming apparatus 1 according to the present invention is preferably adapted to display the used amount of paper (and the accumulated amount thereof) before printing is executed and, thereby, give a user an opportunity to reset the printing conditions. To do this, in the form of displaying a used amount before executing printing, the condition setting portion 12 preferably includes a resetting portion that resets the printing conditions. Referring to FIG. 3, description will be given for the processing in such a form by taking an example in which proposed conditions are displayed selectably and the resetting is urged.

Similarly to the steps S1 to S3 of FIG. 2, the user authentication (step S11), the image inputting (step S12), and the printing condition setting (step S13) are executed. Similarly to step S5 of FIG. 2, the used amount calculating portion 15 calculates the used amount of paper used when an inputted image is printed under the current printing conditions (step S14).

The used amount calculating portion 15 calculates the used amount of paper under the current printing conditions and calculates used amounts of paper respectively under other sets of printing conditions (step S15) and, from those amounts, extracts the used amount of paper under the printing conditions which the used amount of paper becomes less than the used amount under the current printing conditions (step S16). In this manner, the used amount calculating portion 15 calculates the used amount of paper under other printing conditions (one or more of the current printing conditions are changed, etc.) which the used amount of paper is less than the used amount of paper under the current printing conditions.

The display controlling portion 16 controls the displaying portion 13 to preferably display, selectively as the proposed conditions, one or more of the printing conditions under which the used amount of paper is less than the used amount under the current printing conditions, and the displaying portion 13 displays the proposed conditions (step S17). At step S17, the display controlling portion 16 preferably controls the displaying portion 13 to preferably display selectively the used amount of paper under the proposed conditions and/or the used amount of paper under the current printing conditions or the reduced amount of the used amount under the proposed conditions from that under the current conditions together with the proposed conditions, and the displaying portion 13 preferably displays the used amount of paper under the proposed conditions, the current used amount, the reduced amount, etc., together with the proposed conditions.

The resetting portion causes the user to select the conditions to be employed from the proposed conditions and the current printing conditions displayed on the displaying portion 13, and executes resetting of the printing conditions based on the result of the selection. In practice, the displaying portion 13 accepts the selection from the user and judges whether the resetting has been executed (step S18).

When the current printing conditions are continuously employed as a result of the judgment at step S18, the printing portion 14 executes printing under the current printing conditions (step S19) and, similarly to steps S6 and S7 of FIG. 2, the used amount of paper is accumulated under the current printing conditions using the value calculated at step S14 (step S21) and the used amount of paper and the accumulated amount thereof are displayed (step S22).

On the other hand, when other printing conditions are selected as a result of the judgment at step S18, the printing portion 14 executes printing under the selected conditions (step S20) and, similarly to steps S6 and S7 of FIG. 2, the used amount of paper under the selected printing conditions are accumulated using the corresponding calculated value obtained at step S15 (step S21) and the used amount of paper and the accumulated amount thereof are displayed (step S22).

Displaying of the used amount may be executed at the time of step S14, the user may be caused to judge whether the used amount is large or small and may be caused to execute resetting, and the printing, the calculation of the used amount, and the displaying of the used amount may be executed under the printing conditions having been reset to.

Figure 4:
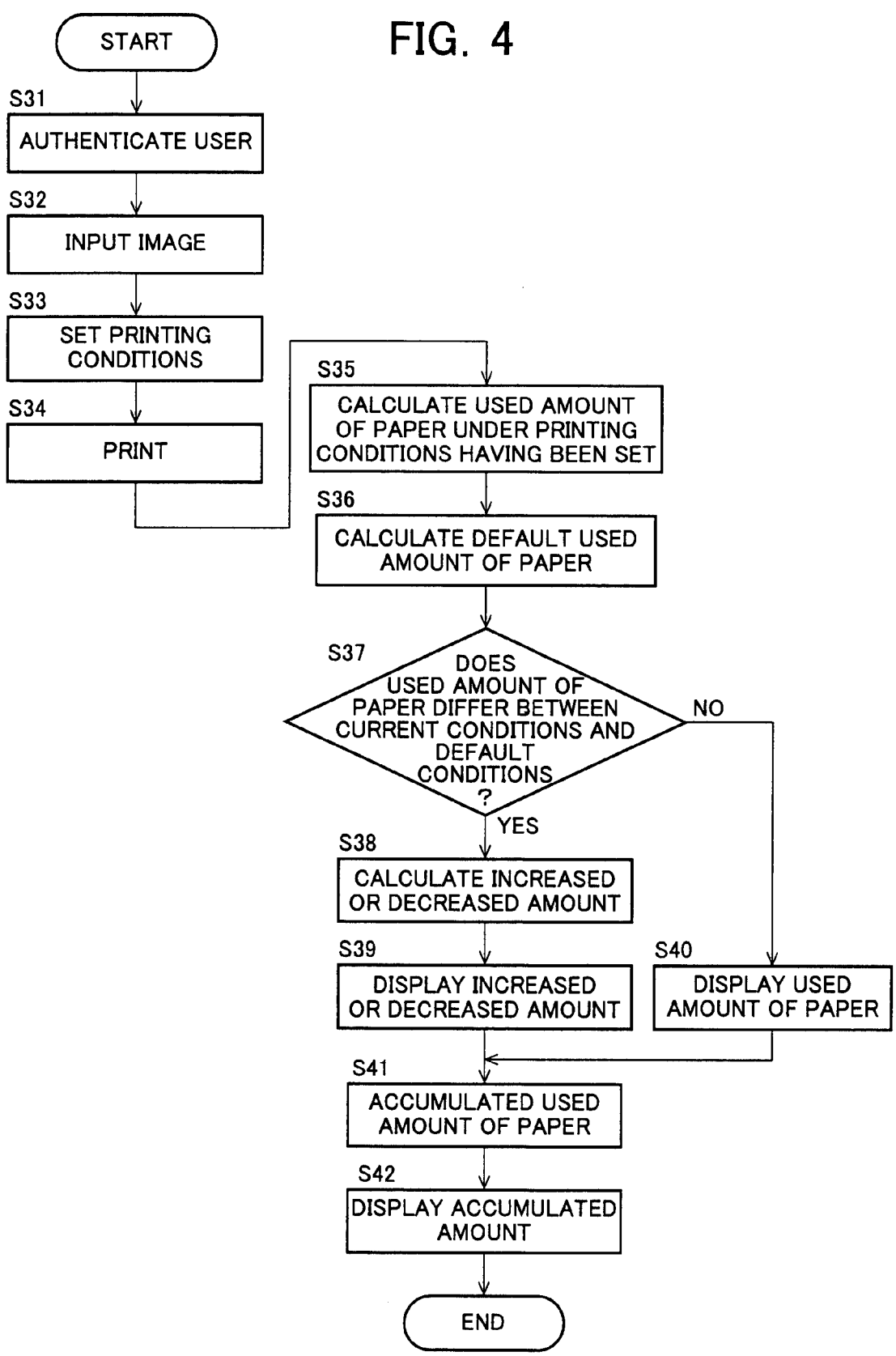
FIG. 4 is an explanatory flowchart of another example of the used amount displaying processing in the image forming apparatus of FIG. 1 and is also an explanatory flowchart of the image forming method according to another embodiment of the present invention.

FIG. 4 is an explanatory flowchart of another example of the used amount displaying processing in the image forming apparatus of FIG. 1 and is also an explanatory flowchart of the image forming method according to another embodiment of the present invention.

As described referring to FIG. 3, the image forming apparatus 1 according to the present invention is preferably caused to display the reduced amount of the used amount under the proposed conditions from that under the current printing conditions and, similarly, how much the used amount under the printing conditions which the actual printing is executed is reduced by from the used amount under the default conditions is preferably indicated to the user. To do this, the used amount calculating portion 15 preferably includes the following default used amount calculating portion. The default used amount calculating portion is a portion that calculates the used amount of paper for default printing from the size and the number of paper sheets used when an image indicated by the image data inputted by the image input portion 11 is printed without any processing made thereto.

In the case where the printing portion 14 executes printing under the printing conditions set by the condition setting portion 12, when the used amount of paper for set printing calculated from the size and the number of paper sheets and the used amount of paper for default printing calculated by the default used amount calculating portion are different for the image indicated by the image data inputted by the image input portion 11, the used amount calculating portion 15 calculates the increased or decreased amount from the used amount of paper for default printing to the used amount of paper for set printing, the display controlling portion 16 controls the displaying portion 13 to display the increased or decreased amount calculated by the used amount calculating portion 15, and the displaying portion 13 displays the increased or decreased amount.

Thereby, the degree of contribution to the environment can be shown to the user and, therefore, the degree of satisfaction of the user can be obtained and the degree of the interest in the ecology can be increased more. Referring to FIG. 4, description will be given for a processing in such a form by taking an example.

Similarly to steps S1 to S5 of FIG. 2, the user authentication (step S31), the image inputting (step S32), the printing condition setting (step S33), the printing (step S34), and the used amount calculation (step S35) are executed. The default used amount calculating portion calculates the used amount of paper when the inputted image is printed under the default printing conditions (step S36).

The used amount calculating portion 15 compares the used amount of paper for set printing calculated from the size and the number of the paper sheets with the used amount of paper for default printing calculated by the default used amount calculating portion for the inputted image when the printing portion 14 executes printing based on the printing conditions set by the condition setting portion 12 (step S37). When those used amount are different from each other as the result of the comparison at step S37, the used amount calculating portion 15 calculates the increased or decreased amount from the used amount of paper for the default printing to the used amount of paper for the set printing as the used amount to be outputted to the display controlling portion 16 (step S38). The display controlling portion 16 controls the displaying portion 13 to display the calculated increased or decreased amount and the displaying portion 13 displays the calculated increased or decreased amount (step S39). On the other hand, when the result is NO at step S37, the display controlling portion 16 controls the displaying portion 13 to display the used amount calculated at step S35 or S36 and the displaying portion 13 displays the used amount (step S40).

Following steps S39 and S40, the accumulating portion 18 calculates the accumulated amount of paper (step S41) and the display controlling portion 16 also controls to display the accumulated amount and the displaying portion 13 also displays together with the used amount and the increased or decreased amount (step S42).

In the embodiment, as described above, the difference between the used amounts of the environmental resources (paper, namely, wood) is displayed for the used amount of recording sheets in the case that the current printing conditions set by the condition setting portion 12 differ from those employed when a read document or a received file is printed without changing the paper sheet size and the number of paper sheets. As described above, the difference in the paper sheet size and the number of recording sheets between the document and the recording sheets for executing printing may be displayed as the difference between the used amounts. Such a difference indicates the reduced amount from the used amount of paper for the default set value by executing the setting such as, for example, shrinking printing, aggregating printing, duplex printing, and black-and-white printing, that are set by a user using the condition setting portion 12 and the reduced amount can be said to be a contribution amount (reduction amount) that contributes the reduction of environmental resources. Not only that the decreased amount but also the increased amount is displayed because the difference between the used amounts is increased (that is, the degree of the contribution is reduced), when a user makes setting of enlarging copying on the condition setting portion 12.

Figure 5:
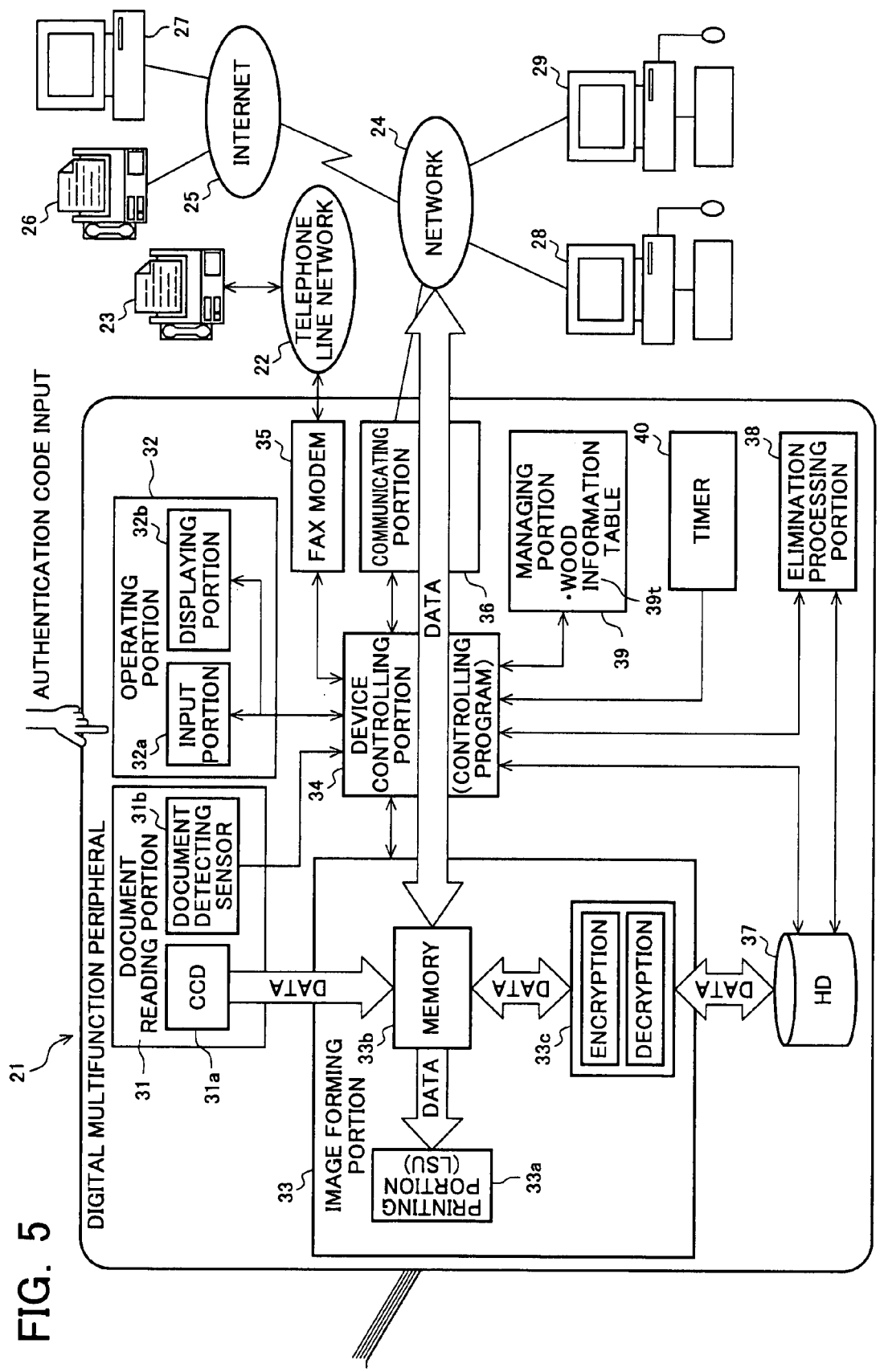
FIG. 5 is an explanatory view of an example of a digital multifunction peripheral as an application of the image forming apparatus of FIG. 1 and a connection configuration.

FIG. 5 is an explanatory view of an example of a digital multifunction peripheral as an application of the image forming apparatus of FIG. 1 and a connection configuration. In FIG. 5: "21" denotes a digital multifunction peripheral as an example of the image forming apparatus; "22" denotes a telephone line network; "23" denotes a facsimile machine for a manager (FAX for a manager); "24" denotes a network; "25" denotes the Internet network; "26" denotes a facsimile machine for the Internet; "27" denotes an external PC; "28" and "29" denote terminal PCs; "31" denotes an image reading portion; "32" denotes an operating portion; "33" denotes an image forming portion; "34" denotes a device controlling portion; "35" denotes a FAX modem; "36" denotes a communicating portion; "37" denotes a hard disk (HD); "38" denotes a deletion processing portion; "39" denotes a elimination portion; "39$t$" denotes a wood information table; and "40" denotes a timer.

The digital multifunction peripheral 21 exemplified in FIG. 5 is connected to the FAX 23 that is, for example, used by a manager, through the telephone line network 22 and is connected to a plurality of terminal PCs 28, 29, . . . , through the network 24 such as a LAN (Local Area Network) or a WAN (Wide Area Network) and further connected to the Internet FAX 26, the external PC 27, etc., which are located outside the network 24 through the Internet network 25. Depending on these network configurations, transmission and reception of various types of data are enabled including reception of image data to be printed.

The digital multifunction peripheral 21 is composed of the image reading portion 31, the operating portion 32, the image forming portion 33, the device controlling portion 34, the FAX modem 35, the communicating portion 36, the HD 37, the elimination processing portion 38, the managing portion 39, and the timer 40. A configuration of the digital multifunction peripheral 21 according to the present invention and a connection configuration to external devices are not limited to the above example, but needed just to include the above portions.

Not all the above portions need to be made by hardware. They can be easily implemented by installing a program that causes a calculation processing apparatus in a controlling portion included in such as the device controlling portion 34 of the digital multifunction peripheral 21 to function as the above portion in a ROM (Read Only Memory) and the like of the controlling portion as firmware, etc., and by causing the calculation processing apparatus to execute the program. As described above, the main feature of the present invention can also be implemented using the program to control display to be installed in the image forming apparatus and the controlling portion that executes the program.

The operating portion 32 consists of a touch panel, etc., that includes a displaying portion 32b that displays an operation picture and an input portion 32a that causes a user to input various settings and operation contents including designation of the object to be printed and printing conditions based on the display. The object to be printed can be designated to be the correct one only by placing a document on the image reading portion 31 and, therefore, the designation of the object to be printed is not limited to be executed on the operating portion 32. Based on the operation on the operating portion 32, the image reading portion 31 detects the presence or the absence of the document using an image detecting sensor 31b, reads the document using a CCD (Charge Coupled Device) 31a, and outputs it as image data. The FAX modem 35 is a modem to execute facsimile communication with the manager FAX 23. The communicating portion 36 controls the communication with the external devices connected to the digital multifunction peripheral 21 through the network 24.

The image forming portion 33 temporarily stores the image data read by the image reading portion and the received data received by the FAX modem 35 or by the communicating portion 36, etc. in a memory 33b and forms an image onto a medium such as a paper sheet from a printing portion 33a loaded with a laser scanning unit (LSU). The image forming portion 33 can also encrypt the data such as the image data stored in the memory 33b using an encryption processing portion 33c and store the encrypted data in the HD 37 and, on the other hand, the image forming portion 33 can also decrypt the encrypted data stored in the HD 37 and output the decrypted data to the external devices via the memory 33b through the network 24, etc., and print and output the data as a medium using the printing portion 33a. The elimination processing portion 38 executes the processing to eliminate the data stored in the HD 37 for maintaining the security and securing of the storage capacity.

The device controlling portion 34 is the main controlling portion connected to each of the above portions, and totally controls the operations of the digital multifunction peripheral 21 including transactions of data among departments referring to management data of the managing portion 39 and a timer time from the timer 40. The managing portion 39 manages management tables including the above wood information table 39t that shows the relationship between recording sheets and the used number of wood, and IP addresses of the machine 21 itself. The timer 40 counts the time for the digital multifunction peripheral 21 to be in the standby state and notifies the device controlling portion 34 of the counted time.

Taking an example of the control by the device controlling portion 34, the operating portion 32 notifies the device controlling device 34 of a copying request instructed by the operation input by the user and various recording conditions, etc. The device controlling portion 34 displays the operating state of the digital multifunction peripheral 21 on a display screen of the displaying portion 32b of the operating portion 32 and instructs the image forming portion 33 to process printing, etc. Referring to FIGS. 1 to 4, as described above or as describes later, the device controlling portion 34 calculates the used amount of paper used when printing is executed under the printing conditions set by the input portion 32a of the operating portion 32 referring to the wood information table 39t and causes the displaying portion 32b of the operating portion 32 to display the used amount.

As described above, in the digital multifunction peripheral 21, the operating portion 32 is provided with the key input portion 32a and the displaying portion 32b and ID input can be executed in addition to function instructing operations of the digital multifunction peripheral 21. In addition to ID input, the digital multifunction peripheral 21 may include an ID card reader that reads the information from an ID card. The digital multifunction peripheral 21 can execute both way data communication with external devices (such as a PC terminal) using the communicating portion 36. The digital multifunction peripheral 21 according to the invention preferably includes any communicating portion like described above.

A copying processing of a document in the above digital multifunction peripheral 21 will be exemplified. Though the copying processing of a document will be exemplified, this example of the processing can be similarly applied to the processing of printing of an image file, etc.

Figure 6:
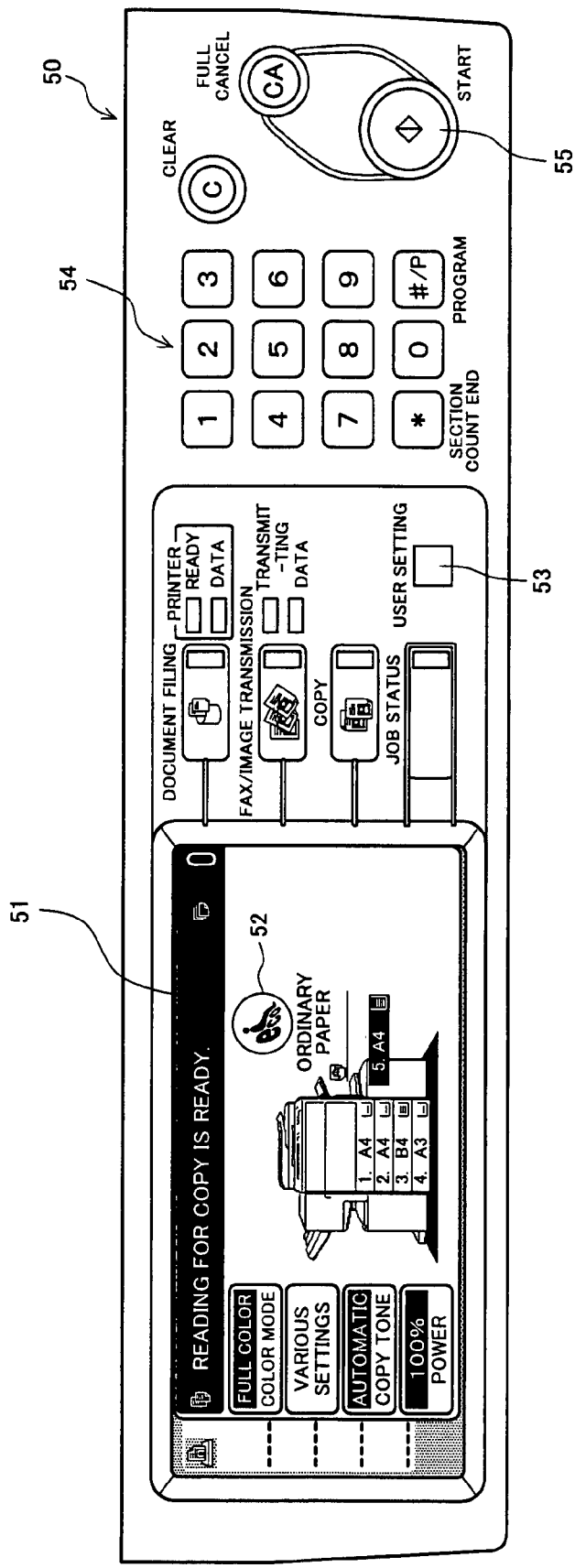
FIG. 6 depicts an example of an operating portion of the digital multifunction peripheral of FIG. 5.
Figure 7A:
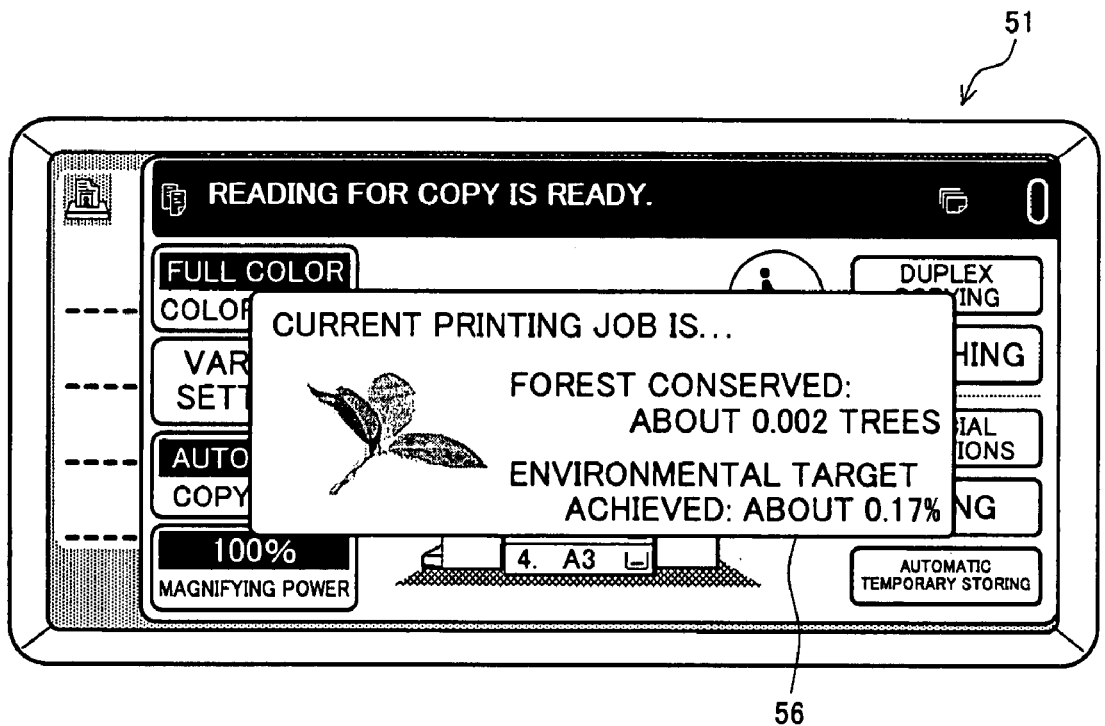
FIG. 7A depicts an exemplary used amount display on the operating panel of FIG. 6.
Figure 7B:
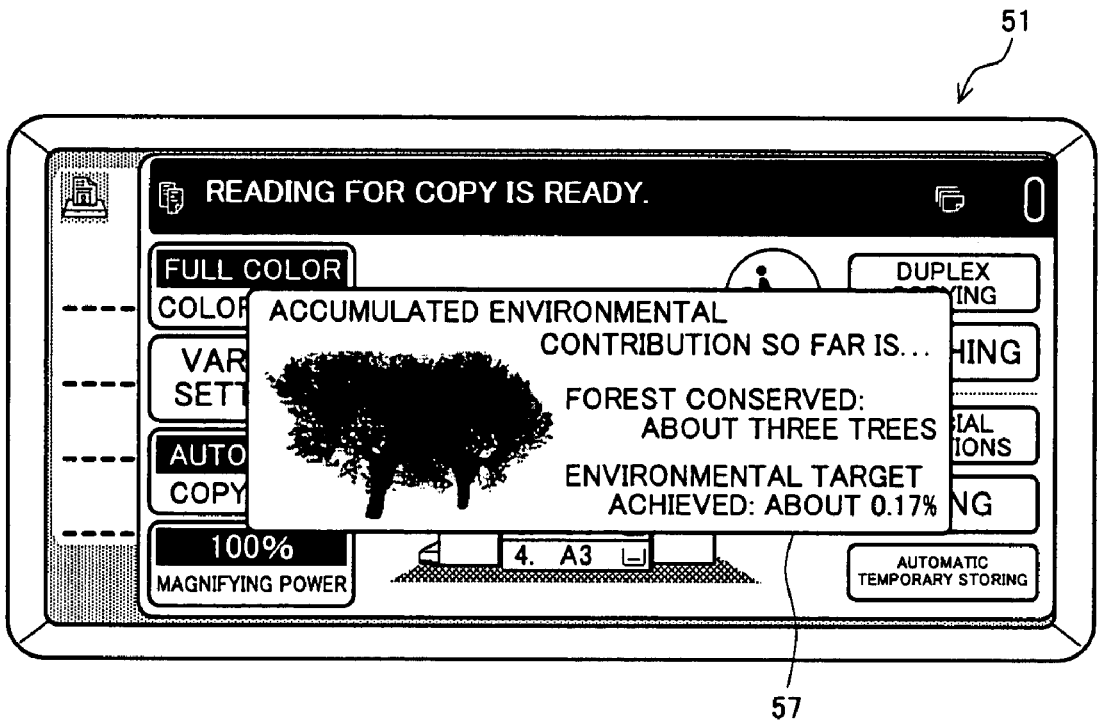
FIG. 7B depicts another exemplary used amount display on the operating panel of FIG. 6.
Figure 8:
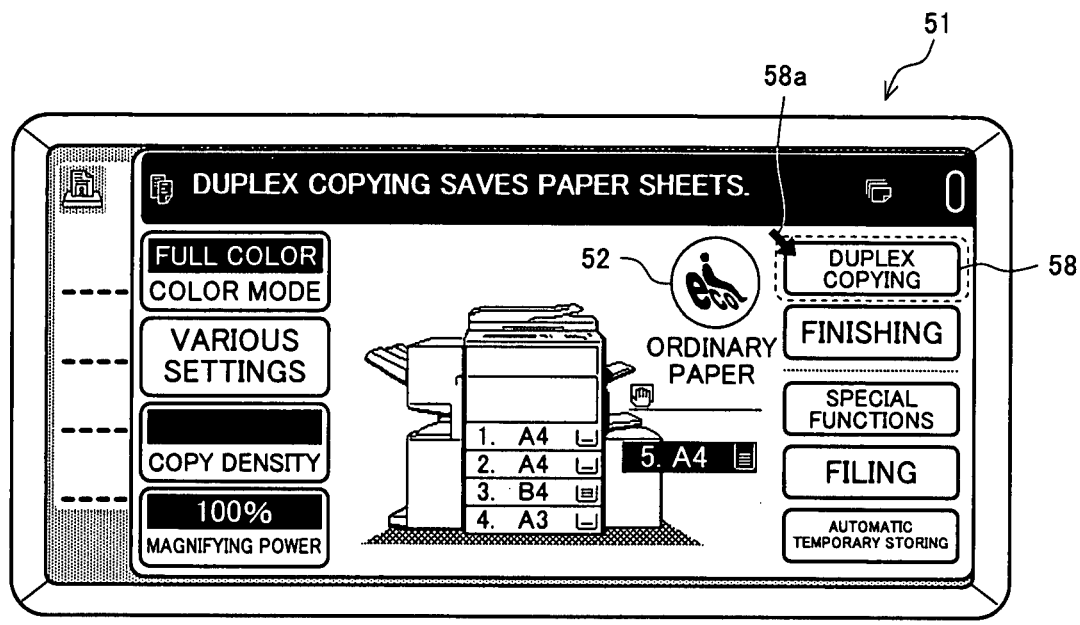
FIG. 8 depicts an exemplary display on the operating panel of FIG. 6.
Figure 9:
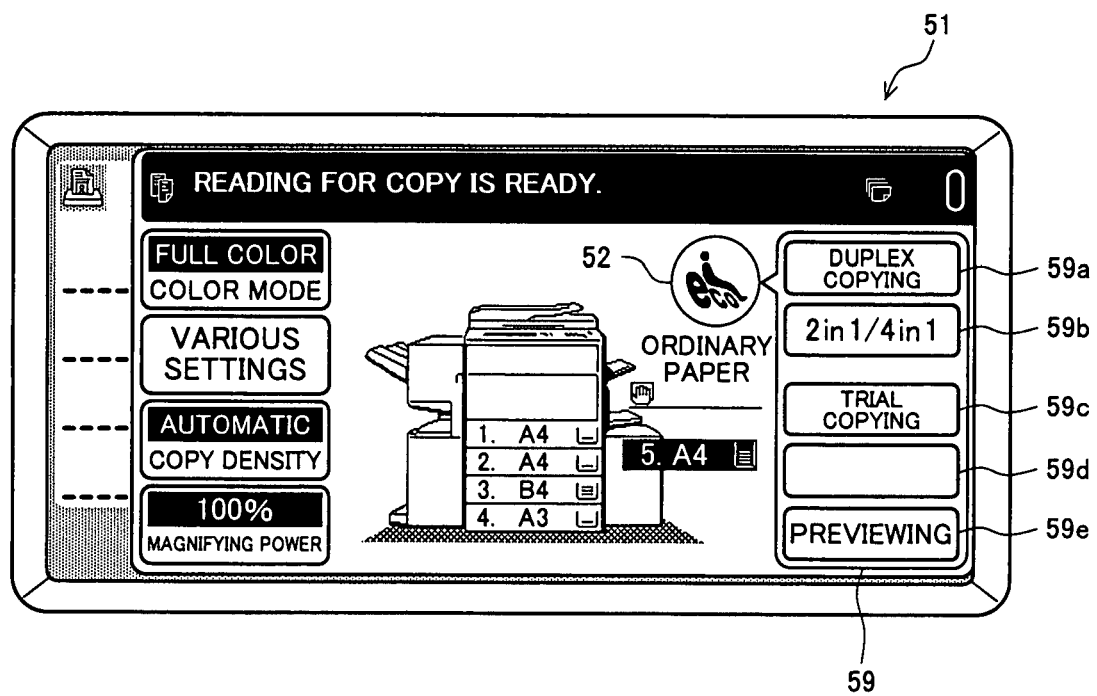
FIG. 9 depicts an exemplary display on the operating panel of FIG. 6.
Figure 10A:
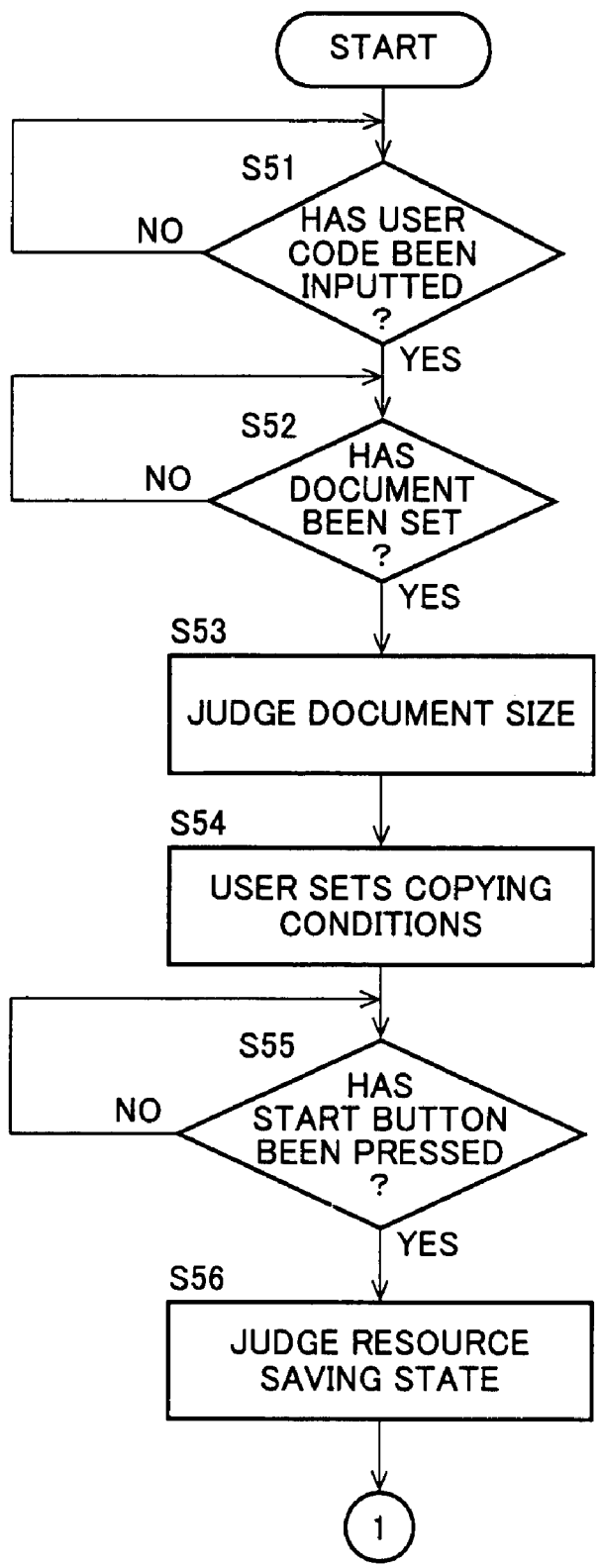
FIGS. 10A and 10B are explanatory flowcharts of an example of copying processing in the digital multifunction peripheral of FIG. 5.
Figure 10B:
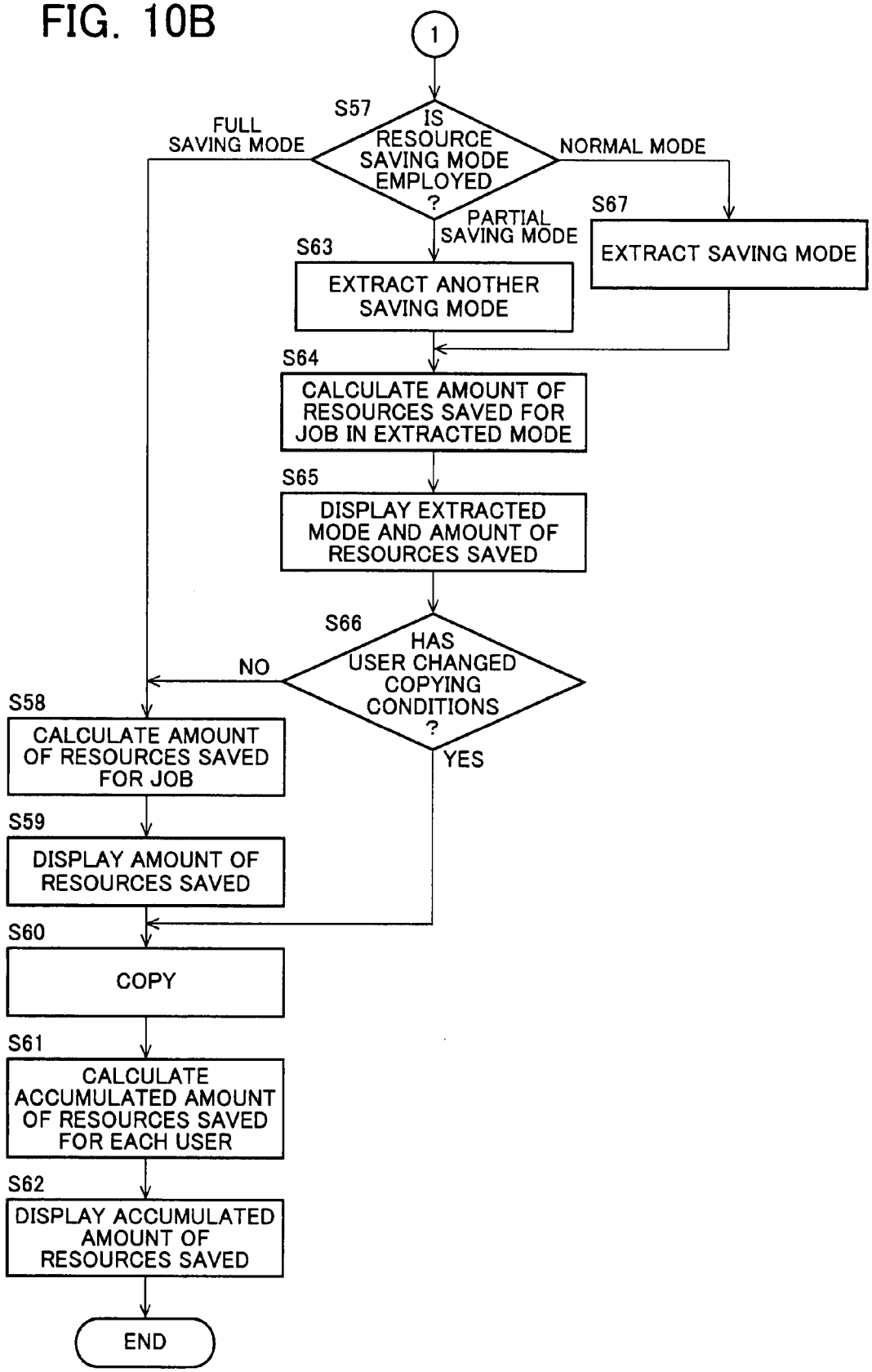

FIG. 6 depicts an example of the operating portion of the digital multifunction peripheral of FIG. 5. FIGS. 7A and 7B depict examples of the display of used amounts in the operating panel of FIG. 6. FIGS. 8 and 9 depict exemplary displays in the operating panel of FIG. 6. In FIG. 6, "50" denotes an example of the operating portion 32 of FIG. 5, "51" denotes a touch panel; "52" denotes an eco-mark; "53" denotes a user setting key; "54" denotes numeral keys; "55" denotes a start key. FIGS. 10A and 10B are explanatory flowcharts of an example of the copying processing in the digital multifunction peripheral of FIG. 5.

The device controlling portion 34 judges whether information (and a password) to identify a user is inputted by the operation of the user who selects him/herself on the touch panel 51 of FIG. 5 or inputs the user ID (user code) using the numeral keys 54 of the operating portion 50 (step S51). At the time when the user code is inputted and authentication thereof is executed, the following processing steps are executed. It is assumed that the user oneself can set whether the used amount displaying processing according to the present invention is executed. FIG. 6 depicts an example of the case where setting is made to execute the used amount display and the fact that the used amount displaying processing is being executed is displayed on the touch panel 51 as the eco-mark 52.

The device controlling portion 34 judges whether a document is set on the image reading portion 31 based on document detection information from the document reading portion 31 (step S52). Only when the document is set, the following processing steps are executed. The device controlling portion 34 judges the size of the document also based on the document detection information (step S53).

In this case, the device controlling portion 34 accepts information that the user inputted copy conditions (for example, A4, duplex printing, etc.) using the touch panel, etc., and makes settings, and displays the settings on the touch panel 51

(step S54). The user is waited for to press down the start key (start button) 55 (step S55). When the pressing down is accepted (step S55: Yes), the document reading portion 31 starts reading the document and checks the number of documents. Based on the number of documents and the copy conditions having been set, the device controlling portion 34 judges the resource saving state based on the copy conditions (step S56) and judges whether the user desires to make copies in a resource saving mode (step S57). For example, the state where the copy conditions are "duplex copying" and "two in one" preferably is judged to be a full saving mode and the state where the copy condition is only either one of the above is preferably judged to be a partial saving mode. The state where none of the above is set is preferably judged to be a normal mode.

When the mode of the apparatus is judged to be the full saving mode at step S57, similarly to the processing steps of steps S35 to S38 of FIG. 4, the device controlling portion 34 calculates the amount of resources saved for the job (the used amount under the set copy condition minus default used amount) (step S58) and causes the touch panel 51 to display the result like a display 56 of FIG. 7A (step S59). The display 56 of FIG. 7A shows that resource saving corresponding to about 0.002 trees can be achieved as forest conservation and simultaneously also shows that this saving has achieved about 0.17% of the environmental target. Employing one recording sheet printed in duplex copying or "n in one" as a criterion, the amount saved to the criterion may be calculated.

After the processing of step S59, the device controlling portion 34 causes the image forming portion 33 to execute copying under the copying conditions (step S60), executes the accumulation processing for each user to calculate the accumulated amount of resources saved (step S61), and causes the touch panel 51 to display the accumulated amount of resources saved like a display 57 of FIG. 7B (step S62). The display 57 of FIG. 7B shows that resource saving corresponding to about three trees in total can be achieved as forest conservation and simultaneously also shows that this saving has achieved about 76% of the environmental target.

When the mode of the apparatus is judged to be the partial saving mode at step S57, the device controlling portion 34 extracts another saving mode (the mode to execute duplex printing and "two in one" printing when the set copy condition is "two in one") (step S63), calculates the amount of resources saved for the job in the extracted mode (step S64) and, as exemplified in FIG. 8, causes the touch panel 51 to display the extracted mode as a proposal (step S65). FIG. 8 depicts an example that displays an arrow 58a to highlight a duplex printing setting key 58 displayed on the touch panel 51 and also displays being highlighted a text such as "You can save the paper sheets by duplex printing", however, the display is not limited to this. At step S65, the amount of resources saved in the extracted mode may be additionally displayed on the touch panel 51.

The device controlling portion 34 judges whether the user has changed the copy conditions when the user watched the display (step S66). When the user has not changed the copy conditions, that is, when the copy conditions set at first remains as they are, the processing of step S58 to S62 are executed. On the other hand, when it is judged that the user has changed the copy conditions at step S66, the device controlling portion 34 executes the copying under the changed copy conditions (step S60), calculates the accumulated amount of resources saved for each user (step S61), and displays the calculation results (step S62).

When it is judged that the mode is the normal mode at step S57, the device controlling portion 34 extracts the saving mode (the mode to execute duplex and "two in one" printing) (step S67), calculates the amount of resources saved for the job in the extracted mode (step S64), and causes the touch panel 51 to display the extracted mode as a proposal as exemplified in FIG. 9 (step S65). In FIG. 9, the eco-mark 52 is reverse-highlighted and an extracted mode display 59 is displayed by popup. At step S65, the amount of resources saved in the extracted mode may be additionally displayed on the touch panel 51. After step S65, the processing at steps following step S55 may be executed.

The exemplified extracted mode display 59 includes a duplex copying key 59a, a two-in-one/four-in-one copying key, a trial copying key 59c to execute trial printing in the mode having been reset, a filing key 59d to shift to filing without printing, and a preview key 59e to preview on the screen. The preview key 59e is especially used to save the paper sheets by just previewing a facsimile instead of printing the facsimile when the facsimile has been received. However, the extracted mode display is not limited to that exemplified in FIG. 9 and only the keys corresponding to the currently executable mode are preferably displayed. When the amount of resources saved in the extracted mode is displayed on the touch panel 51, the amount is preferably displayed next to the keys 59a to 59e.

The increased or decreased amount is obtained at steps S56 and S57 in the manner similar to steps S35 to S38 of FIG. 4 and the mode may be judged to be the normal mode when the value of the increased or decreased amount is zero, the mode may be judged to be the partial saving mode or the full saving mode when the value of the amount is equal to or less than a predetermined value, and the mode may be judged to be the full saving mode when the value of the amount is a second predetermined value that is less than the predetermined value.

Though the image forming apparatus according to the present invention is described, each of the above main featured portions of the present invention may be realized by a program to be installed in a computer connected to the image forming apparatus, that is, a program to monitor the image forming apparatus or a driver program for the image forming apparatus, and a controlling portion that executes the program. A simplified description will be given below for the implementation of the above printing controlling program.

Figure 11:
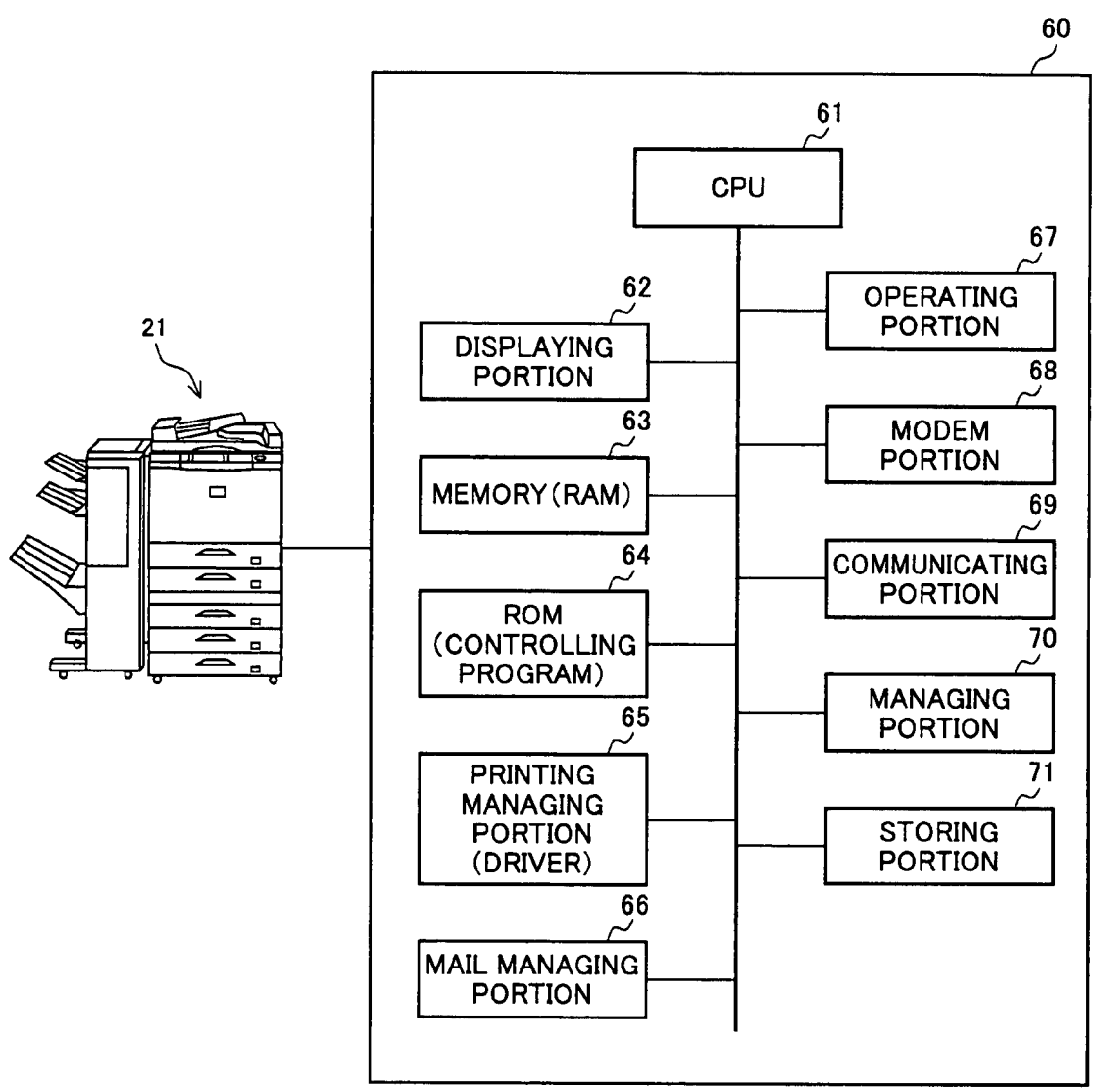
FIG. 11 depicts an exemplary configuration of a PC that installed a printing controlling program according to the present invention.

FIG. 11 depicts an exemplary configuration of a PC according to the present invention that installs a printing controlling program. In FIG. 11, "60" denotes a PC; "61" denotes a CPU (Central Processing Unit); "62" denotes a displaying portion; "63" denotes a memory such as a RAM (Random Access Memory); "64" denotes a ROM that stores an operating system and other controlling programs; "65" denotes a printing managing portion; "66" denotes a mail managing portion; "67" denotes an operating portion; "68" denotes a modem portion; "69" denotes a communicating portion; "70" denotes managing portion; and "71" denotes a storing portion.

The PC 60 exemplified in FIG. 11 is exemplified as assuming that the PC 60 includes, as the main components thereof, the operating portion 67, the storing portion 71, the communicating portion 69, the modem portion 68, the displaying portion 62, the printing managing portion 65 consisting of the printing controlling program according to the present invention and data, the mail managing portion 66, the managing portion 70, a hard disk or the ROM (This may be a rewritable ROM) 64, the CPU 61, and the memory 63 such as a RAM as an executing area of the CPU 61 and they are connected to each other through a bus.

The operating portion 67 consist of a keyboard, a mouse, etc., to input various types of information including the printing conditions. The storing portion 71 is a storing device such as a hard disk or an external recording medium reading device. The communicating portion 69 consisting of a network devices for input/output from/to other devices including the digital multifunction peripheral 21, etc. The modem 68 is a modem that executes facsimile communication through a telephone line. The displaying portion 62 is a display such as a CRT or a LCD to display the setting picture of the printing condition, the used amount, the accumulated amount, and other information. The printing managing portion 65 consists of a program to control printing (such as a printer driver or a printer monitoring program) that controls the printing by the printing apparatus including the digital multifunction peripheral 21 connected to the PC 60, and the storing portion 71, etc., actually stores this program in an executable form. The mail managing portion 66 consists of a mailer that executes transmission and reception of mail through the communicating portion 69 and the modem portion 68, etc., and the ROM 64, the storing portion 71, etc., actually store this program in an executable form. The managing portion 70 consists of a managing program and the like that manage electronic files and the information thereof and the ROM 64, the storing portion 71, etc., actually store this program in an executable form. The hard disk or the ROM (may be a rewritable ROM) 64 is a memory that stores an OS (Operating System) and other controlling programs in executable forms. The CPU 61 is a processing apparatus to execute the programs stored in the ROM 64 and the storing portion 71, and the memory 63 such as a RAM is used as the execution area for the CPU 61 to execute the program.

To execute the used amount display of paper according to the present invention using the PC 60, the mail managing portion 66, the modem portion 68, and the managing portion 70 are not indispensable. However, the mail managing portion 66 and the modem portion 68 may also be used to receive image files to be printed and the managing portion 70 may also be used to read the image files stored in the hard disk, etc.

The printing controlling program according to the present invention that is loaded on the PC 60 connected to the image forming apparatus (exemplified by the digital multifunction peripheral 21) is a program to be executed by the CPU 61 and it includes an image identifying step for identifying image data to be printed by the digital multifunction peripheral 21; a condition setting step for making settings by causing a user to input the setting on the operating portion 67 and displaying the printing condition for executing the printing by the digital multifunction peripheral 21 on the displaying portion 62 at the same time; a used amount calculating step for calculating the used amount of paper from the size and the number of recording sheets used by executing printing by the digital multifunction peripheral 21 based on the printing conditions set at the condition setting step; and a used amount displaying step for causing the displaying portion 62 to display the used amount calculated at the used amount calculating step. The memory 63 temporarily stores the information handled by those apparatuses during the processing thereof and, thereafter, the various types of ROMs 64 and the hard disk store that information. The CPU 61 reads, corrects, and writes that information when necessary. Other applications are as exemplified in FIGS. 1 to 10B and the explanation thereof are omitted.

The printing controlling program according to the present invention is referred to as so-called a "printer driver (or may be included in the printer monitoring program)" and is incorporated as a graphical user interface (GUI) for the displaying portion 62 to facilitate the use of the apparatus by users. The printing controlling program executes the processing for such as, for example: displaying a picture on which the printing conditions can be set when a printing instruction is executed in the state where a file is opened; calculating the used amount and the accumulated amount of paper referring to the wood information table stored also in the storing portion 71 and based on the default number and the default size of the paper sheets of the file and the printing conditions set by the user at this time; and causing the displaying portion 62 to display the calculation result. In this case, the accumulated amount may be obtained by inquiring it of the digital multifunction peripheral 21.

As described above, referring to FIGS. 1 to 11, description has been given for each of the embodiments mainly for the image forming apparatus, the image forming method, the programs (the program to be installed in the image forming apparatus and the program to be installed in the computer) of the present invention. However, the above programs may be distributed as a computer-readable recording medium recorded them or may be broadcasted through a network.

A simplified description will be given for a recording medium recorded the programs and the data to realize the function of displaying the used amount according to the present invention. It can be assumed that the recording medium specifically is a CD-ROM, a photo-magnetic disk, a DVD-ROM, an FD, a flash memory, and various types of other ROM and RAM. The above programs are recorded in these recording media and distributed and, thereby, the realization of the function is facilitated. The above described recording medium is attached to the information processing apparatus such as a computer exemplified in FIG. 11, to read out the programs. The programs are transferred and stored in the controlling portion in the image forming apparatus of FIG. 1 or the digital multifunction peripheral of FIG. 5. And the function of displaying the used amount according to the present invention can be executed by reading the programs out of its recording medium when necessary. The function of displaying the used amount according to the present invention can be executed by reading out the programs by attaching the above described recording medium to the information processing apparatus such as the computer exemplified in FIG. 11 in order to execute the programs on a computer, otherwise, by reading the programs, when necessary, which are once stored in a recording medium included in the information processing apparatus.

According to the present invention, the used amount of recording sheets that a user uses when an image is formed can be displayed and the degree of interest of the user in the ecology can be improved.

The invention claimed is:

1. An image forming apparatus having an image input portion that inputs image data, a printing portion that prints onto a recording sheet an image indicated by the image data inputted by the image input portion, a condition setting portion that sets printing conditions for executing printing by the printing portion, and a displaying portion that displays the printing conditions that the condition setting portion has set, the apparatus comprising:

a used amount calculating portion that calculates the used amount of paper from the size of and the number of recording sheets used by executing the printing by the printing portion for the image indicated by the image data inputted by the image input portion based on the current printing conditions that the condition setting portion has set, calculates the used amount of paper for default printing from the size of and the number of paper sheets onto which the image indicated by the image data inputted by the image input portion is printed as it is, and subtracts the used amount of paper for the default printing from the used amount of paper calculated based on the current printing conditions to thereby calculate the amount of resources saved for printing under the current printing conditions;

a display controlling portion that controls the displaying portion to display the amount of resources saved that the used amount calculating portion has calculated; and a mode judging portion that judges whether resource saving state is a full saving mode from the current printing conditions, wherein when it is judged by the mode judging portion to be the full saving mode, during execution of printing or after execution of printing by the printing portion, the display controlling portion controls the displaying portion to display the amount of resources saved calculated based on the current printing conditions, and when it is judged by the mode judging portion to be not the full saving mode, before executing the printing by the printing portion, the used amount calculating portion extracts other printing conditions under which the used amount of paper is less than the used amount of paper under the current printing conditions, calculates the used amount of paper under the extracted other printing conditions, and subtracts the used amount of paper for the default printing therefrom to thereby calculate the amount of resources saved for printing under the other printing conditions, and the display controlling portion controls the displaying portion to display the other printing conditions or the other printing conditions and the amount of resources saved calculated based on the other printing conditions as proposed conditions, and the condition setting portion has a resetting portion that causes a user to select conditions to be employed from the proposed conditions and the current printing conditions displayed on the displaying portion and executes resetting of the printing conditions based on the selection result.

2. An image forming apparatus as defined in claim 1, wherein
the condition setting portion is a portion that sets conditions including any one or more of variable power printing, aggregating printing, and duplex printing as the printing conditions employed when the printing portion executes printing.

3. An image forming method of executing printing onto a recording sheet in an image forming apparatus, comprising:
an image inputting step by an image input portion for inputting image data,
a condition setting step by a condition setting portion for setting printing conditions for executing printing,
a displaying step by a displaying portion for displaying the printing conditions set at the condition setting step,
a printing step by a printing portion for printing onto a recording sheet an image indicated by the image data inputted at the image inputting step based on the printing conditions set at the condition setting step,
a used amount calculating step by a used amount calculating portion for calculating the used amount of paper from the size of and the number of recording sheets used by executing the printing by the printing portion for the image indicated by the image data inputted at the image inputting step based on the current printing conditions set at the condition setting step, calculating the used amount of paper for default printing from the size of and the number of paper sheets onto which the image indicated by the image data inputted at the image inputting step is printed as it is, and subtracting the used amount of paper for the default printing from the used amount of paper calculated based on the current printing conditions to thereby calculate the amount of resources saved for printing under the current printing conditions,
a mode judging step by a mode judging portion for judging whether the resource saving state is a full saving mode from the current printing conditions;
a step by a display controlling portion for, when it is judged at the mode judging step to be the full saving mode, during execution of printing or after execution of printing by the printing portion, controlling the displaying portion to display the amount of resources saved calculated based on the current printing conditions;
a step by the used amount calculating portion for, when it is judged at the mode judging step to be not the full saving mode, before executing the printing by the printing portion, extracting other printing conditions under which the used amount of paper is less than the used amount of paper under the current printing conditions, calculating the used amount of paper under the extracted other printing conditions, and subtracting the used amount of paper for the default printing therefrom to thereby calculate the amount of resources saved for printing under the other printing conditions and by the display controlling portion for controlling the displaying portion to display the other printing conditions or the other printing conditions and the amount of resources saved calculated based on the other printing conditions as proposed conditions; and
a resetting step by the condition setting portion for causing a user to select conditions to be employed from the proposed conditions and the current printing conditions displayed on the displaying portion and executing resetting of the printing conditions based on the selection result.

4. A non-transitory computer readable medium including a display controlling program to be installed in a controlling portion of an image forming apparatus including an image input portion that inputs image data, a printing portion that prints onto a recording sheet an image indicated by the image data inputted by the image input portion, a condition setting portion that sets printing conditions for executing printing by the printing portion, and a displaying portion that displays the printing conditions that the condition setting portion has set, and the program being operable to drive the controlling portion to execute, comprising,
a used amount calculating step for calculating the used amount of paper from the size of and the number of recording sheets used by executing the printing by the printing portion for the image indicated by the image data inputted by the image input portion based on the current printing conditions set by the condition setting portion, calculating the used amount of paper for default printing from the size of and the number of paper sheets onto which the image indicated by the image data inputted by the image input portion is printed as it is, and subtracting the used amount of paper for the default printing from the used amount of paper calculated based on the current printing conditions to thereby calculate the amount of resources saved for printing under the current printing conditions, and to drive the controlling portion to execute,
a mode judging step for judging whether the resource saving state is a full saving mode from the current printing conditions, a step for, when it is judged at the mode judging step to be the full saving mode, during execution of printing or after execution of printing by the printing portion, controlling the displaying portion to display the amount of resources saved calculated based on the current printing conditions, a step for, when it is judged at the mode judging step to be not the full saving mode, before executing the printing by the printing portion, extracting other printing conditions under which the used amount of paper is less than the used amount of paper under the current printing conditions, calculating the used amount of paper under the extracted other printing conditions, and subtracting the used amount of paper for the default printing therefrom to thereby calculate the amount of resources saved for printing under the other printing conditions, and a step for controlling the displaying portion to display the other printing conditions or the other printing conditions and the amount of resources saved calculated based on the other printing conditions as proposed conditions, and a resetting step for causing a user to select conditions to be employed from the proposed conditions and the current printing conditions displayed on the displaying portion and executing resetting of the printing conditions based on the selection result.

5. A non-transitory computer readable medium including a program to be installed in a computer connected to an image forming apparatus through a network, and the program being operable to drive the computer to execute steps comprising:

an image identifying step for identifying image data to be printed in the image forming apparatus;

a condition setting step for setting printing conditions for executing printing in the image forming apparatus while causing a displaying apparatus to display the printing conditions;

a used amount calculating step for calculating the used amount of paper from the size of and the number of recording sheets used by executing the printing in the image forming apparatus for the image indicated by the image data identified at the image identifying step based on the current printing conditions set at the condition setting step, calculating the used amount of paper for default printing from the size of and the number of paper sheets onto which the image indicated by the image data identified at the image identifying step is printed as it is, and subtracting the used amount of paper for the default printing from the used amount of paper calculated based on the current printing conditions to thereby calculate the amount of resources saved for printing under the current printing conditions, and to drive the computer to execute;

a mode judging step for judging whether the resource saving state is a full saving mode from the current printing conditions;

a step for, when it is judged at the mode judging step to be the full saving mode, during execution of printing or after execution of printing by the image forming apparatus, controlling the displaying apparatus to display the amount of resources saved calculated based on the current printing conditions;

a step for, when it is judged at the mode judging step to be not the full saving mode, before executing the printing by the image forming apparatus, extracting other printing conditions under which the used amount of paper is less than the used amount of paper under the current printing conditions, calculating the used amount of paper under the extracted other printing conditions, and subtracting the used amount of paper for the default printing therefrom to thereby calculate the amount of resources saved for printing under the other printing conditions, and for controlling the displaying apparatus to display other printing conditions or the other printing conditions and the amount of resources saved calculated based on the other printing conditions as proposed conditions; and a resetting step for causing a user to select conditions to be employed from the proposed conditions and the current printing conditions displayed on the displaying apparatus and executing resetting of the printing condition.

* * * * *